United States Patent [19]

Anderson

[11] 4,391,173
[45] Jul. 5, 1983

[54] SHEARING CRADLE

[76] Inventor: Colin C. Anderson, 6 Montrose Pl., Beaumont, South Australia, Australia

[21] Appl. No.: 324,449

[22] Filed: Nov. 24, 1981

Related U.S. Application Data

[63] Continuation of Ser. No. 108,164, Dec. 28, 1979, abandoned.

[30] Foreign Application Priority Data

Jan. 2, 1979 [AU] Australia ............................. PD7250

[51] Int. Cl.³ .............................................. B26D 7/06
[52] U.S. Cl. ....................................... 83/424; 83/701; 83/813; 83/871; 30/205; 17/21
[58] Field of Search ................. 83/401, 424, 428, 436, 83/701, 733, 746, 781, 788, 809, 813, 871, 874, 925 R; 17/21; 30/205; 69/24, 25, 36; 119/103; 144/208 F, 208 G, 208 H, 208 J

[56] References Cited

U.S. PATENT DOCUMENTS

| 81,210 | 8/1868 | Reid ...................................... 30/205 |
| 3,145,607 | 8/1964 | Geary ............................... 83/701 X |
| 3,267,976 | 8/1966 | Keeney ........................... 144/208.6 |
| 3,957,568 | 5/1976 | Abel ................................. 83/871 X |
| 4,010,515 | 3/1977 | Koyama ............................... 17/21 |
| 4,051,760 | 10/1977 | Glennan ...................... 83/925 R X |

FOREIGN PATENT DOCUMENTS 501826 1/1978 Australia .
1158694 12/1963 Fed. Rep. of Germany ... 144/208.6

Primary Examiner—James L. Jones, Jr.
Assistant Examiner—Robert P. Olszewski
Attorney, Agent, or Firm—Oldham, Oldham, Hudak, Weber & Sand Co.

[57] ABSTRACT

A shearing cradle to support a sheep in a reclined position on rollers. Shearing device situated between a pair of rollers, so that as the rollers rotate, the sheep is shorn by the shearing device.

6 Claims, 3 Drawing Figures

SHEARING CRADLE

This is a continuation of application Ser. No. 108,164 filed Dec. 28, 1979, now abandoned.

This invention relates to an improved shearing cradle, and more particularly to a cradle which is of assistance to an operator in shearing of sheep.

BACKGROUND OF THE INVENTION

Over the years, various attempts have been made to provide various machines and devices or methods for assisting in the shearing of sheep, or even for the automatic shearing of sheep either mechanically or chemically.

However, various of these proposals and attempts have had serious drawbacks, and attention has been directed in various areas for holding the sheep in a suitable position and how to make the shearing more convenient for the operator and for the automatic shearing of sheep.

Thus in my earlier Australian Pat. No. 501,826 there is described a cradle including a frame supporting a plurality of generally horizontal rollers adapted to support a sheep lying on the rollers, and yoke means adapted to carry securing means to secure the front legs of a sheep, and further means to secure the rear legs of the sheep. In this way while the sheep is lying on the rollers, which rollers are formed parallel to each other in an arcuate manner, that the sheep can be rotated by rotating the rollers to present the varying portions of the sheep to the operator so that the operator shears that portion of the sheep which is most conveniently situated.

The cradle includes a framework supported on legs or the like, the framework supporting a series of rollers. Preferably, there are four rollers and extend the length of the frame, with the rollers being parallel to each other but arranged so that the central rollers are at a lower level than the outer-most rollers to thus form a depression. The rollers can be driven in the same direction of rotation, this preferably being by chains and sprockets, and can be driven by a foot lever pivoted on an axle, a ratchet being provided in the drive train so that by actuation of the pedal, the rollers are driven in the one direction.

Thus when a sheep is lying in the depression of the rollers, on actuation of the rollers the sheep will be rotated so that the shearing can be accomplished on that portion of the sheep which is most convenient to the operator.

Various means can be provided for holding the sheep, preferably by clamps attached to the legs to stretch the sheep and immobilize the sheep on the rollers.

It is with this form of shearing cradle that the present invention is concerned, and the invention is directed to providing on the cradle shearing or cutting means, so that as the sheep is rotated at least a portion of the sheep will be shorn by the shearing or cutting head incorporated with the cradle.

BRIEF DESCRIPTION OF THE INVENTION

In one general form of the invention, there is provided apparatus for shearing sheep, said apparatus comprising means for supporting the sheep in a reclining position, means for cutting the wool from the sheep along a major length of the body of the sheep, and means to rotate such sheep to present unshorn wool to the cutting means.

DESCRIPTION OF THE PREFERRED EMBODIMENT

Figure 1:
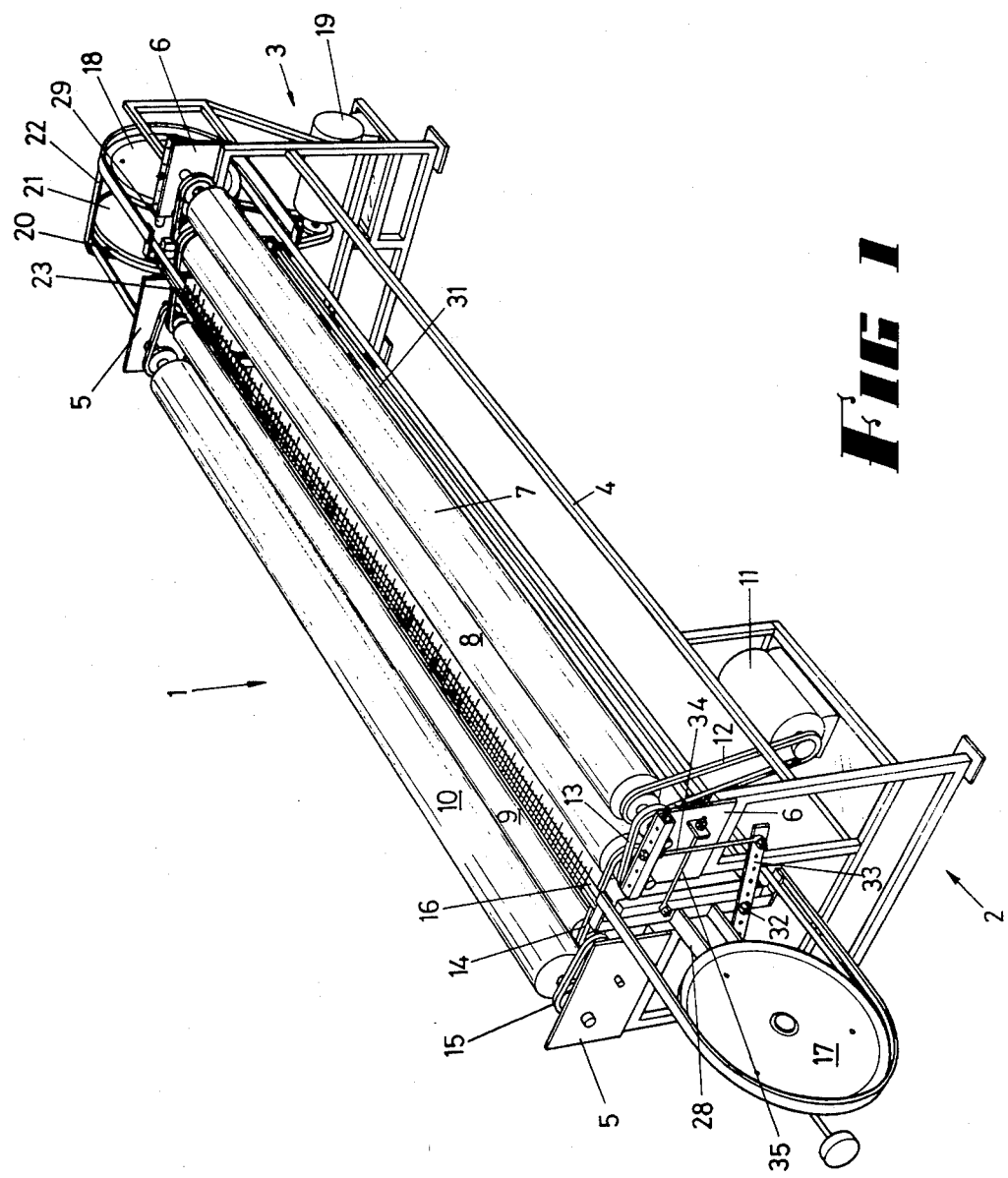
FIG. 1 shows a perspective view of one form of the invention.
Figure 2:
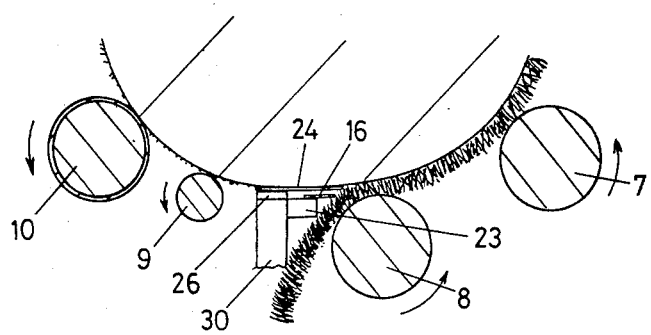
FIG. 2 is a section through the rollers and cutter the sheep being shown diagrammatically.
Figure 3:
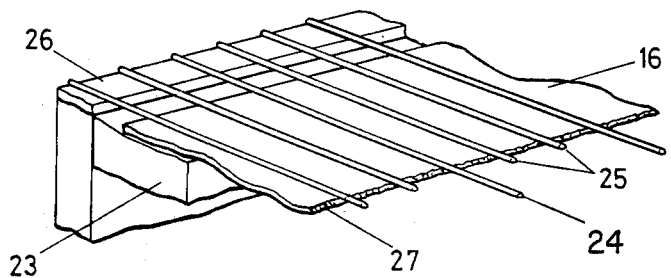
FIG. 3 is a view of portion of the cutting blade.

The cradle 1 comprises end frames 2, 3 stabilized by longitudinal tie members 4, the end frames 2, 3 include bearing plates 5, 6 at each end to mount the bearings (not shown) for the axles of the rollers 7, 8, 9 and 10.

The rollers 7, 8, 9 and 10 are driven by a suitable driving motor 11 mounted on a frame 2 and under the control of a manual control (not shown).

The motor 11 can be any suitable motor, either electrical hydraulic, and be such that it is under variable speed control, and has large torque at relatively low revolutions per minute, so that the motor 11 can drive the rollers at a slow speed when required.

The rollers 7, 8, 9 and 10 are connected to the motor 11 by suitable belts 12, 13, 14 and 15 engaging respective pulleys. Alternatively, a chain drive can be utilized while in a further embodiment the rollers can be turned manually, for example by a foot pedal actuating a suitable ratchet drive, so that the operator can rotate the rollers.

The rollers 7, 8, 9 and 10 are mounted with their axis parallel but forming a concave depression generally conforming to the outline of a sheep lying longitudinally along the rollers.

Between the lowermost rollers 8, 9 the shearing or cutting unit is provided, this including an endless knife belt 16, carried by pulleys 17, 18, the pulley 18 being driven by a motor 19 by V belt 20 driving a pulley 21 on shaft 22 on which pulley 18 is mounted, the pulleys 17, 18 being mounted in N frames 2, 3 respectively.

The knife belt, 16 operates over an angle plate 23 and under the fingers 24, 25.

These fingers are mounted, for example, by clamping or welding or brazing to a plate 26 behind the knife belt 16 to extend across the knife belt 16 with the fingers 24 being longer and extending a short distance past the fingers 25 which protrude just past the cutting edge 27 of the knife belt 16.

The cutting edge 27 of the knife belt 16 is bevelled to a cutting edge with the edge being serrated. The serrations can be at the edge itself, but preferably the bevelled surface is serrated. These serrations are of a fine or small nature and one manner of satisfactorily producing such serrations is to form the bevel by applying a coarse rotary grinding wheel to the moving knife belt 16.

The fingers 24 and 25 are wirelike and with their pointed ends easily protrude through the wool, and it has been found that the serrations on the belt 16, effectively cut the wool fed to the knife by the fingers. While it is known that a sharply honed edge will not satisfactorily cut wool, the small serrations apparantly effectively grip and cut the fibres.

The rollers 7, 8 and 9 support the sheep, and at least roller 10 is provided with a frictional rough material to grip the shorn skin of the sheep and pull the skin taut to eliminate wrinkles and to draw the skin and sheep past the knife belt 16 while assisting in the rotation of the sheep.

In use, the sheep is placed on the cradle from a catching race similar to that in Australian Pat. No. 501826 mounted above and behind the cradle so that the sheep is tipped direcly onto the cradle to lie with its feet uppermost, the sheep is then constrained by a yoke and leg clamps similar to that shown in my earlier Australian Pat. No. 501,826 but which details are omitted for the sake of clarity of the present invention.

The sheep while lying on the cradle is then shorn over the belly, legs, neck and head by the operator using a conventional hand piece. The sheep is then laid on its side with its legs facing towards the upper left of the cradle in FIG. 1 with the already shorn portion on the side lying over the knife belt and fingers. The rollers are then driven and as the sheep rotates the fingers will enter the uncut wool and knife belt will then cut the wool from the sheep.

The sheep is then guided during its roation by the rollers to present the wool to the knife belt and fingers, the cut fleece passing down between the rollers to be removed by a conveyor belt (not shown) this being of the type shown in Austrailian Pat. No. 501,826 but mounted at a lower level than shown in that patent.

Thus in order to effectively shear this sheep, a portion of the sheep is shorn by hand by a hand piece, the junction of the shorn edge and the fleece on the sheep is presented to the knife belt to shear the wool. The pulleys 17, 18 are each supported by pulley frames 28, 29 which themselves are rigidly interconnected by rail 30 which carry the angle plate 23 and the plate 26.

At their lower end, the pulley frames, 28, 29 are interconnected by a tie member 31 so that the pulley and frames 28, 29 handle 23, are a single rigid structure.

This rigid structure is adjustably mounted in end frames 2, 3 so that the cutting belts 16 and cutting fingers 24, 25 can be adjustably positioned relative to the rollers. Each pulley frame, 28, 29 is supported by a pivot 32 by lever 33 pivoted to the end frame, the other end of the lever 33 being supported by adjusting rod 34 to the end frame 2. Hence by adjustment of rod 34 the pulley frame 28 can be raised and lowered.

A further rod 35 connects the pulley frame 28 to the end frame 2 so that by adjustment of this rod, the pulley frame can be moved laterally to vary the distance between the fingers 24, 25 knife belt 16 and the roller 8.

In a further alternative, the rail 30 can be rigidly attached to the end frames 1 and 2, and the pulley end frames 28, 29 adjustably positioned to cause the knife belt 16 to track correctly over the angle, with the rollers 7, 8, 9 and 10 being adjustably mounted in the bearing plates to vary the relative position of the knife belt and rollers to most efficient cutting.

It is to be appreciated that when the sheep is lying on the rollers, that that portion of the sheep which is in contact with the rollers is virtually straight and follows the rollers so that these rollers present the surface of the sides and back of the sheep in a virtually straight line so that a cutter can easily shear the wool from the sheep.

One advantage of the present invention is that the sheep is presented to the cutter whereas in other experimental work which is known to the inventor the sheep is positioned and the cutters are moved towards the sheep with varying sensing devices to sense the position of the cutter relative to the sheep.

However, in the present invention due to the fact that the sheep is lying in the depression formed by the rollers the skin of the sheep is virtually constantly relatively positioned in relation to the rollers, and by providing a cutting head the sheep can be shorn during its rotation by the rollers.

Thus in operation of the shearing cradle the sheep can be positioned on its back and in this position the operator would shear the belly, chest and open up the neck and around the head of the sheep, and then would make one or two longitudinal blows along the flank or side of the sheep.

The sheep can then be turned on its side with the cutting head positioned in the shorn area along the side towards the belly of the sheep. Thus by then rotating the sheep the cutter would cut the wool along the sides, back and opposite side of the sheep and during this movement the operator could be free then to shear the legs both front and rear and around the rump of the sheep so that in effect during this time the sheep is being shorn in two places at once, one automatically and the other manually by the operator.

The exact shearing sequence would need to be determined by experiment and time and motion studies in order to achieve optimum technique but it is envisaged that the shearing time would be halved.

Thus the area of skin which is shorn is virtually straight along the rollers, due to the weight of the sheep being supported on the rollers.

However, it is also contemplated that the rollers or particularly the roller adjacent the cutting head be formed in a slightly flexible manner, such as a hard rubber roller which could deform and bend to a certain degree. In this connection also the cutting head could be correlated to this roller, and if the cutter is formed as a band knife that the knife in its guides could also be moved out of the longitudinal plane to be similarly curved and to thus follow the contour of the sheep which corresponds again to the roller, so that the cutting head can thus follow the contour of the sheep to a certain degree.

It is realized that the cutting head can be adjustable in relation to the rollers and particularly in relation to the skin of the sheep so that the wool is cut to the desired length.

The cutting head could in an alternative, be movable from a retracted position between the rollers to its cutting position, so that the head can be retracted when not required.

Thus it will be seen that there is provided according to the invention an improved shearing unit with the complete shearing operation being carried out at the one station, and the manual skirting and trimming operations can be carried out if desired while the automatic shearing takes place over the major portion of the sheep.

Although various forms of the invention have been described in detail it is to be realized that precise form of the invention is not to be limited thereto but can include various modifications falling within the spirit and scope of the invention. The claims defining this invention are as follows:

I claim:

1. Apparatus for shearing sheep, said apparatus comprising a frame supporting a plurality of propelled parallel rollers extending longitudinally of the frame to support a sheep in a reclining position, an endless belt cutter positioned between an adjacent pair of said rollers, said rollers being positioned to have central and outermost rollers with the central rollers lower than the outermost rollers to allow the sheep to lie on the rollers, said cutter means being characterized by said endless belt cutter having a course extending axially of said rollers intermediate said central rollers, and means to drive the rollers to move the sheep through an arc to present the unshorn wool to the endless belt cutter.

2. Apparatus for shearing sheep as defined in claim 1, wherein said cutter means is characterized by said belt cutter cooperating with wire like fingers of a comb and, all of said rollers have surface portions lying in an arc and forming a support for the sheep, said endless belt cutter course also lying in said last-named arc.

3. Apparatus for shearing sheep as defined in claim 2, wherein said fingers overlie the endless belt cutter and some of the fingers are shearing fingers that protrude past the cutting edge to penetrate the wool before it is cut and the other fingers extend beyond the cutting edge to maintain the skin spaced from the cutting edge, and means positioned below said course of said endless belt cutter to aid in operatively positioning the same.

4. Apparatus for shearing sheep as defined in claim 1 characterized in that said endless belt cutter has a serrated cutting edge to engage and cut the wool.

5. Apparatus for shearing sheep as defined in claim 1 wherein the fingers overlie the endless belt cutter and some of the fingers protrude past the cutting edge to penetrate the wool before it is cut, and the other fingers maintain the skin space on the cutting edge.

6. Apparatus for shearing sheep as defined in claim 1 characterized in that at least one of the rollers engaging the shorn skin of the sheep is provided with frictional material to grip the skin, assist in turning the sheep and maintain the skin taut over the cutter means.

* * * * *